US 6,578,992 B2

(12) United States Patent
Hiramatsu et al.

(10) Patent No.: US 6,578,992 B2
(45) Date of Patent: Jun. 17, 2003

(54) VEHICULAR LAMP SYSTEM FOR AUTOMOTIVE VEHICLE

(75) Inventors: Machiko Hiramatsu, Kanagawa (JP); Kiyotaka Ozaki, Kanagawa (JP); Kinya Iwamoto, Yokohama (JP); Kenjo Umezaki, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/810,564

(22) Filed: Mar. 19, 2001

(65) Prior Publication Data

US 2001/0030870 A1 Oct. 18, 2001

(30) Foreign Application Priority Data

Apr. 4, 2000 (JP) ....................................... 2000-102664

(51) Int. Cl.$^7$ ................................................. B60Q 1/00
(52) U.S. Cl. ....................................................... 362/465
(58) Field of Search ............................ 362/464, 465, 362/467, 523, 524, 525, 466

(56) References Cited

U.S. PATENT DOCUMENTS

| 5,711,590 | A |   | 1/1998 | Gotoh et al. .................. 362/43 |
| 6,010,237 | A | * | 1/2000 | Gotou ........................... 362/460 |
| 6,193,398 | B1 | * | 2/2001 | Okuchi et al. ................ 362/466 |
| 6,293,686 | B1 | * | 9/2001 | Hayami et al. ............... 362/465 |
| 6,478,460 | B2 | * | 11/2002 | Furuya et al. ................ 362/514 |

FOREIGN PATENT DOCUMENTS

| JP | 2-45234 | 2/1990 |
| JP | 8-183385 | 7/1996 |

* cited by examiner

Primary Examiner—Sandra O'Shea
Assistant Examiner—Anabel Ton
(74) Attorney, Agent, or Firm—Foley & Lardner

(57) ABSTRACT

In a vehicular lamp system having a displaceable light distribution section which radiates a light from a light source into a predetermined light distribution area and is enabled to displace its light distribution state toward a direction toward which a displacement angle thereof to an optical axis of the light source is formed, a drive section which drives the displaceable light distribution section to displace a light distribution state from the optical axis of the light source by displacement angle, a steering angle sensor which detects a steering angle of a vehicular steering wheel, and a controller which controls the drive section to displace light distribution section by the displacement angle in accordance with a detected value of the steering angle, a gain setting section is provided in the controller to set a gain prescribing the displacement angle of the displaceable light distributing section with respect to the detected value of the steering wheel to fall in a predetermined range such as to displace the displaceable light distribution section by a predetermined displacement angle smaller than the detected value of steering angle. The predetermined range is between ⅙ and ½.

21 Claims, 16 Drawing Sheets

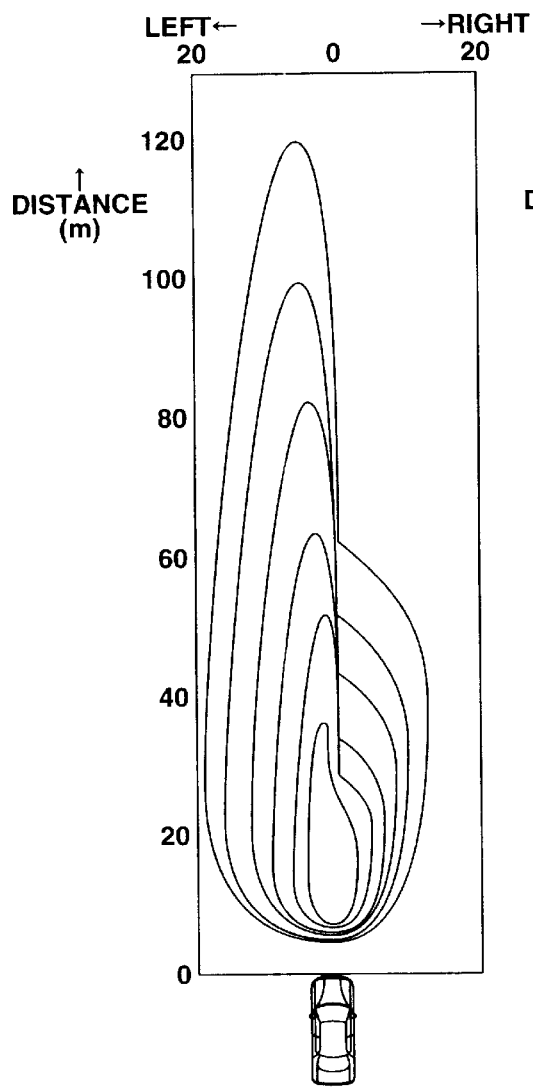
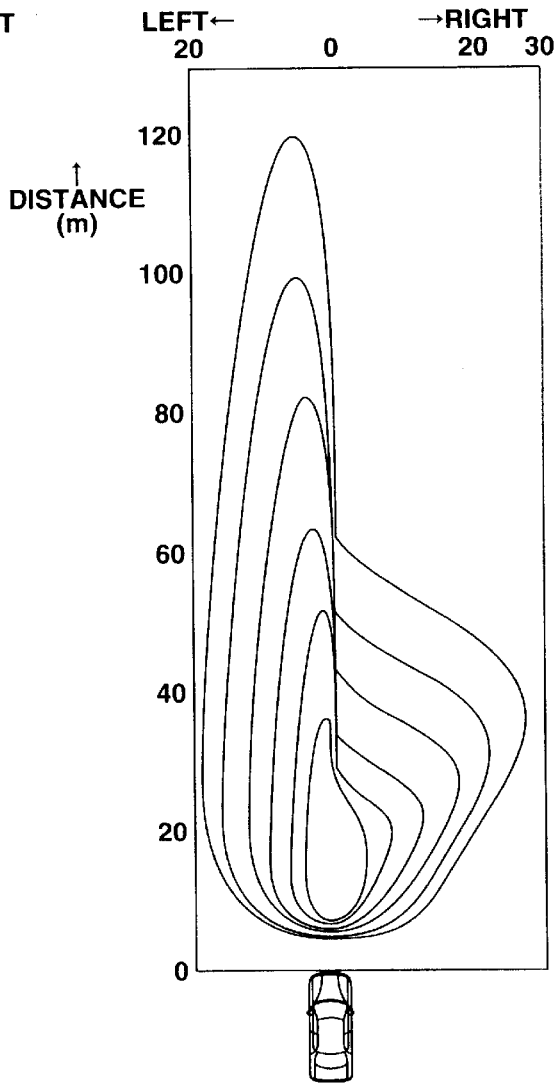
FIG.8A — LIGHT DISTRIBUTION PATTERN WITHOUT CONTROL
FIG.8B — LIGHT DISTRIBUTION PATTERN WHEN PIVOTED THROUGH 30°

VEHICULAR LAMP SYSTEM FOR AUTOMOTIVE VEHICLE

BACKGROUND OF THE INVENTION a) Field of Invention

The present invention relates to a vehicular lamp system, such as a headlamp system, for a vehicle such as an automotive vehicle.

b) Description of Related Art

Each of a Japanese Patent Application First Publication No. Heisei 8-183385 published on Jul. 16, 1996 (which corresponds to a U.S. Pat. No. 5,711,590 issued on Jan. 27, 1998) and a Japanese Patent Application Second (examined) Publication No. Heisei 5-25697 (which corresponds to a Japanese Patent Application First Publication (Unexamined) No. Heisei 2-45234 published on Feb. 15, 1990) exemplifies previously proposed vehicular lamp systems.

In the previously proposed vehicular lamp system disclosed in the former Japanese Patent Application (JP8018385), a reflector is divided into two portions: an upper displaceable (movable) light distribution reflector; and a lower fixed light distribution reflector.

The lower fixed light distribution reflector is designed to reflect 50 to 60% of a total quantity of light applied to the reflector. The upper displaceable light distribution reflector is designed to reflect the remaining percentage of the total quantity of light. During the vehicular turn of a corner, the lower fixed light distribution reflector serves to secure a visibility of a vehicular front lighting area and an upper displaceable light distribution area is pivotally displaced toward a direction of turning so as to radiate the light from a light source onto a vehicular forwarding direction.

On the other hand, in the previously proposed vehicular headlampd is closed in the latter Japanese Patent Application Second Publication, a light radiation direction is continuously varied together with a steering operation of a steering wheel and a gain of a radiation angle of light with respect to a steering angle is fixedly set as 1 to 1.

SUMMARY OF THE INVENTION

However, since, in the vehicular headlamp disclosed in the former Japanese Patent Application First Publication, a pivotal control for the upper displaceable light distribution reflector often causes a visibility of surrounding of the vehicle to be insufficient during turn of vehicle on a traffic intersection. Conversely, in order to improve the visibility, an extremely highly responsive pivotal control to the steering operation is carried out. This causes such an abrupt change in the light distribution as if a switch on-and-off control for light were carried out to change a light distribution so that an insufficient feeling is given to a vehicular driver.

Since, in the previously proposed vehicular lamp disclosed in the latter Japanese Patent Application Second Publication, a gain of the lamp radiation angle to angular displacement of steering wheel is set as 1 to 1 so that when a steering wheel is quickly steered, the gain remains unchanged so that a vehicular driver gives insufficient feeling. Hence, there is a limit in improving the visibility without giving the insufficient feeling to the vehicular driver.

It is, hence, an object of the present invention to provide a vehicular lamp system which can improve a visibility both in a front lighting area and in turning direction of the vehicle without giving an insufficient feeling to a vehicular driver even during a run of the vehicle on a traffic intersection.

According to one aspect of the present invention, there is provided a vehicular lamp system, comprising: a displaceable light distribution section that radiates a light from a light source into a predetermined light distribution area and is enabled to displace its light distribution state toward a direction toward which a displacement angle thereof to an optical axis of the light source is formed; a drive section to drive the displaceable light distribution section to displace its light distribution state from the optical axis of the light source by the displacement angle; a steering angle sensor to detect a steering angle of a vehicular steering wheel; and a controller to control drive section to displace the light distribution section by the displacement angle in accordance with a detected value of the steering angle, the controller comprising a gain setting section that sets a gain prescribing the displacement angle with respect to detected value of the steering angle to fall in a predetermined range such as to displace the displaceable light distribution section by a predetermined displacement angle smaller than the detected value of the steering angle.

According to another aspect of the present invention, there is provided a vehicular lamp system, comprising: a displaceable light distribution section that radiates a light from a light source into a predetermined light distribution area and is enabled to displace a light distribution state thereof toward a direction toward which a displacement angle thereof to an optical axis of the light source is formed; a drive section to drive displaceable light distribution section to displace light distribution state from the optical axis of the light source by a displacement angle; a steering angle sensor to detect a steering angle of a vehicular steering wheel; and a controller to control drive section to displace the light distribution section by the displacement angle in accordance with a detected value of steering angle, the controller comprising a gain setting section that sets a gain prescribing the displacement angle of the displaceable light distributing section with respect to a detected value of the steering angle to fall in a predetermined range such as to both of a visibility of the light distribution area and an inverse of a level of insufficient feeling have exceeded predetermined preferable evaluation values in a sensory evaluation test.

This summary of the invention does not necessarily describe all necessary features so that the invention may also be a sub-combination of these described features.

BRIEF DESCRIPTION OF THE DRAWINGS

FIGS. 8A and 8B are plan views of the vehicle shown in FIG. 1 for explaining road surface light distribution patterns when no control is executed for displacement angle of each displaceable light distribution section of vehicular lamp system (FIG. 8A) and when the control is executed for the displacement angle of each displaceable light distribution section of the vehicular lamp system (FIG. 8B).

DETAILED DESCRIPTION OF THE PREFERRED EMBODIMENTS

Reference will hereinafter be made to drawings in order to facilitate a better understanding of present invention.

(First Embodiment)

Figure 1:
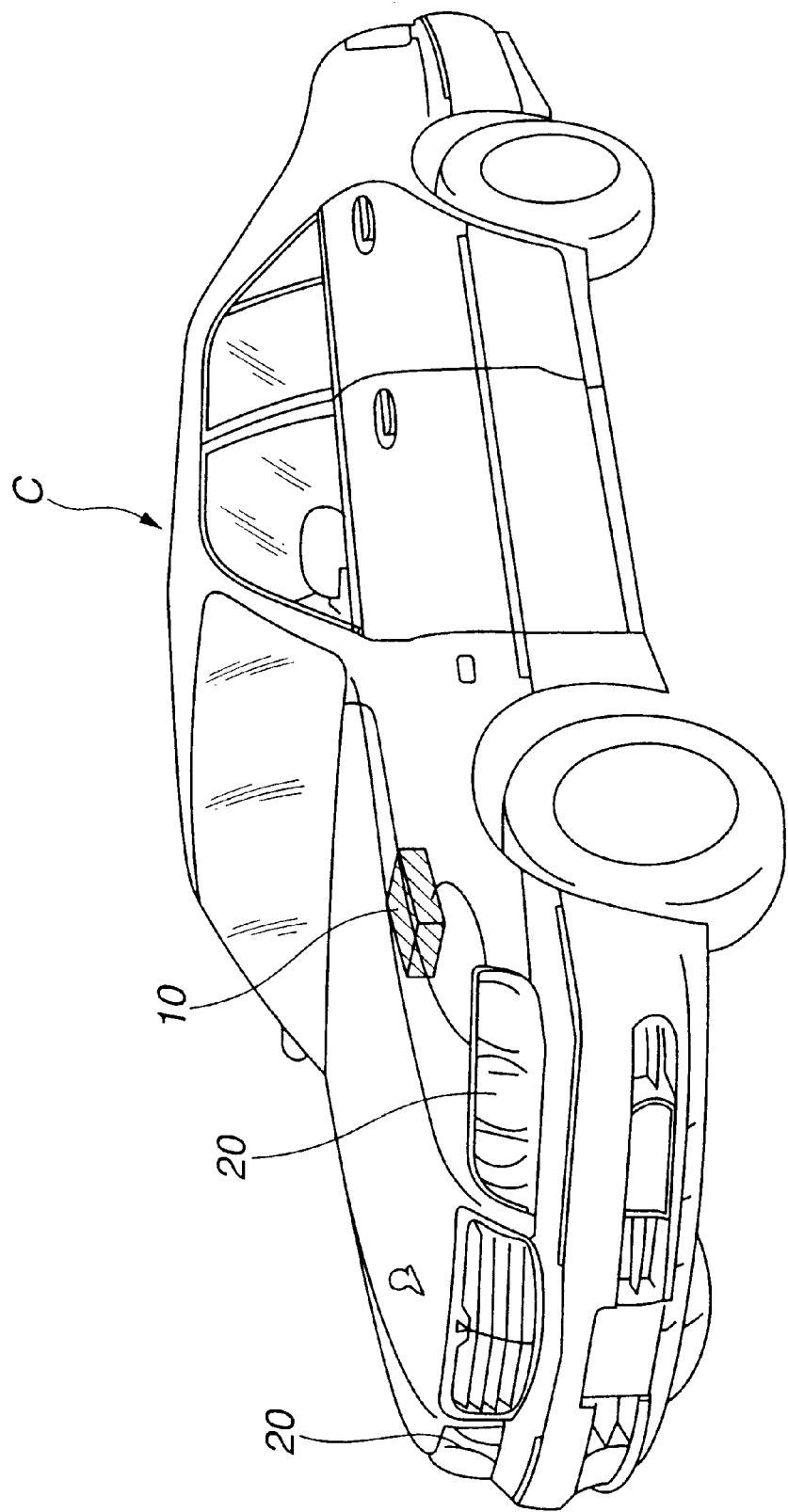
FIG. 1 is a perspective view of an automotive vehicle to which a vehicular lamp system in a first preferred embodiment according to the present invention is applicable.

FIG. 1 shows a perspective view of a vehicle C to which a vehicular lamp system in a first preferred embodiment is applicable.

In vehicle C, headlamps 20 and 20 are installed on front left and right ends of a vehicle body and are controlled by signals outputted from a controller 10. Left and right headlamps 20 and 20 are symmetrically arranged and have basically the same structures.

Figure 2:
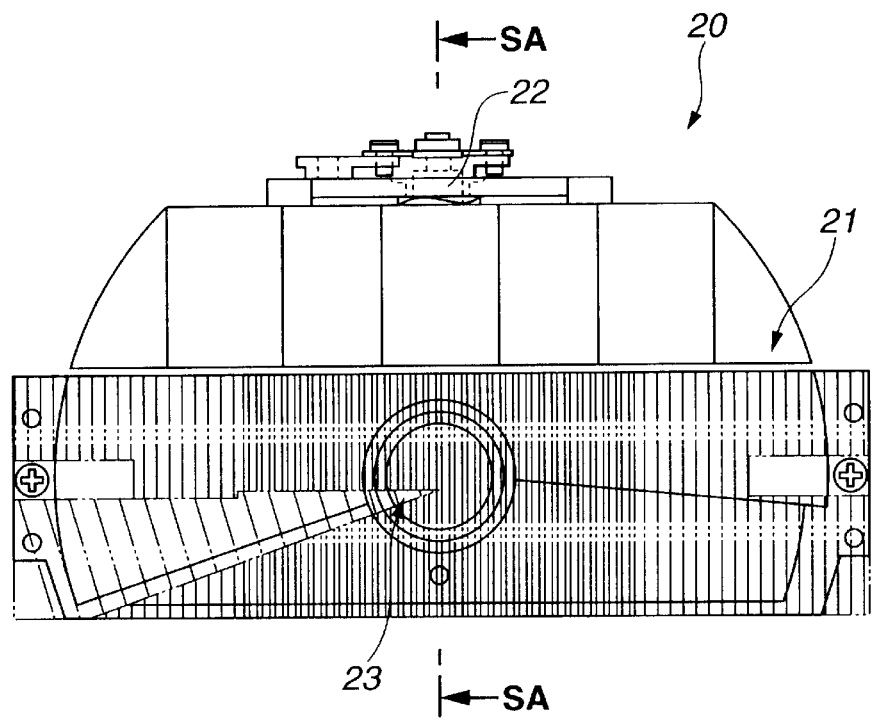
FIG. 2 is an elevation view of a headlamp used in the first preferred embodiment according to the present invention.
Figure 3:
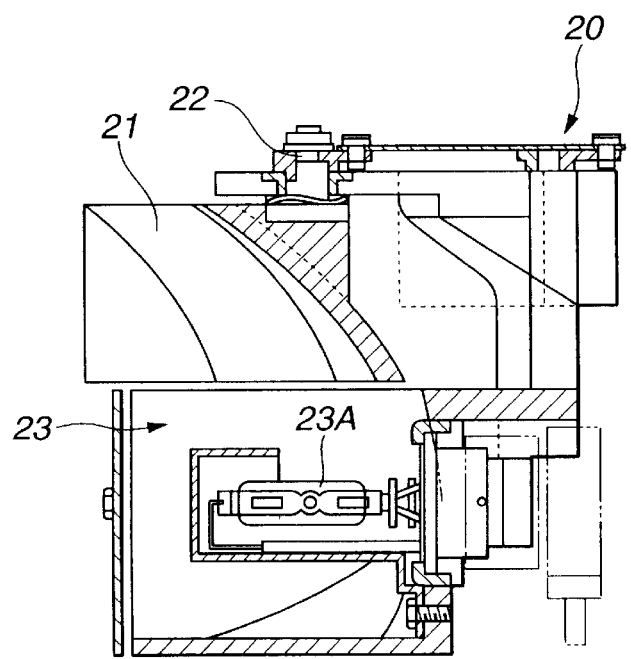
FIG. 3 is a cross sectional view of a headlamp cut away along a line SA—SA shown in FIG. 2.

FIGS. 2 and 3 show elevation view of one headlamp 20 and cross sectional view cut away along a line of SA—SA in FIG. 2.

As shown in FIG. 2, each of headlamps 20 and 20 includes: an upper displaceable light distribution section 21; a driver 22; and a lower fixed light distribution section 23 (driver section).

Upper displaceable light distribution section 21 serves to radiate a light of a light source 23A, does not include a principal optical axis, and is supported pivotally in the left ward and rightward directions. Lower fixed light distribution section 23 includes principal optical axis. Driver 22 (which corresponds to a drive section) is attached onto an upper part of displaceable light distribution section 21 and is driven to pivot displaceable light distribution section 21 in horizontally leftward and rightward directions so that radiation diameter and the range can be displaced in the leftward and rightward directions as its light distribution state.

Figure 4:
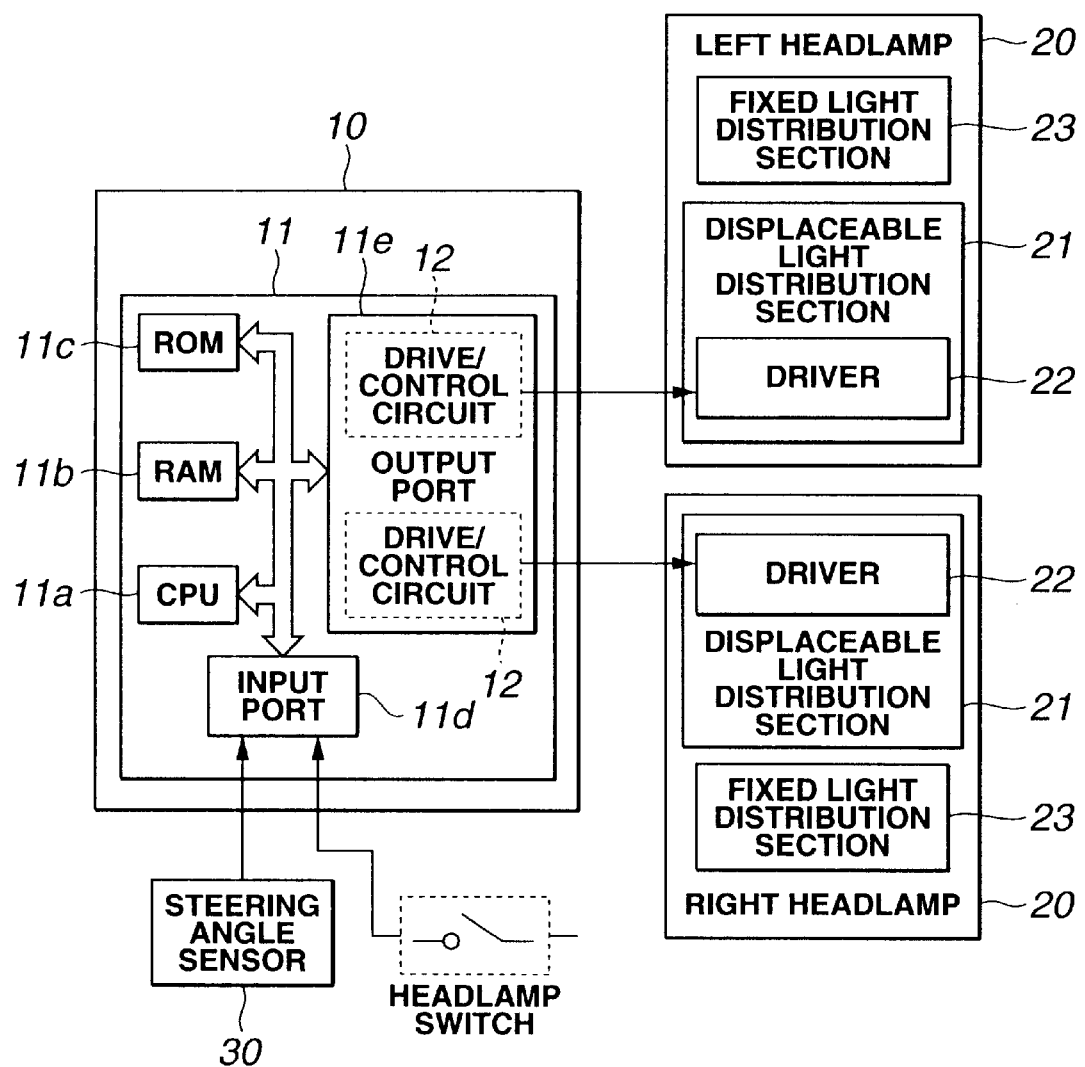
FIG. 4 is a circuit-and-functional block diagram of the vehicular lamp system in the first preferred embodiment according to present invention.

FIG. 4 shows a circuit block diagram of the vehicular lamp system in the first preferred embodiment representing a relationship between controller 10 and left and right headlamps 20 and 20.

As shown in FIG. 4, controller 10 includes an arithmetic operation circuitry 11 and a pair of drive/control circuits 12 and 12.

Arithmetic operation circuitry 11 receives an output signal from a steering angle sensor 30.

In details, steering angle sensor 30 detects a steering angular displacement (hereinafter, referred to as a steering angle) of a steering wheel of vehicle C and outputs a steering angle indicative signal to arithmetic operation circuitry 11 of controller 10. Arithmetic operation circuitry 11 sets a displacement angle θP of displaceable light distribution section 21 on basis of steering angle indicative signal and outputs a displacement angle control signal to each drive/control circuit 12 and 12. Each of drive/control circuits 12 and 12 outputs a drive signal to a corresponding driver 22. Displaceable light distribution section 21 is, thus, pivoted in leftward or rightward direction.

It is noted that driver 22 includes, for example, a DC motor as shown in FIGS. 2 and 3 and a pivot section.

It is also noted that arithmetic operation circuitry 11 is constituted by a microcomputer having a CPU 11a (Central Processing Unit), a RAM 11b (Random Access Memory), and an Input Port lid, an Output Port lie, and a common bus and drive/control circuits 12 and 12 are formed in Output Port 11e.

Figure 5:
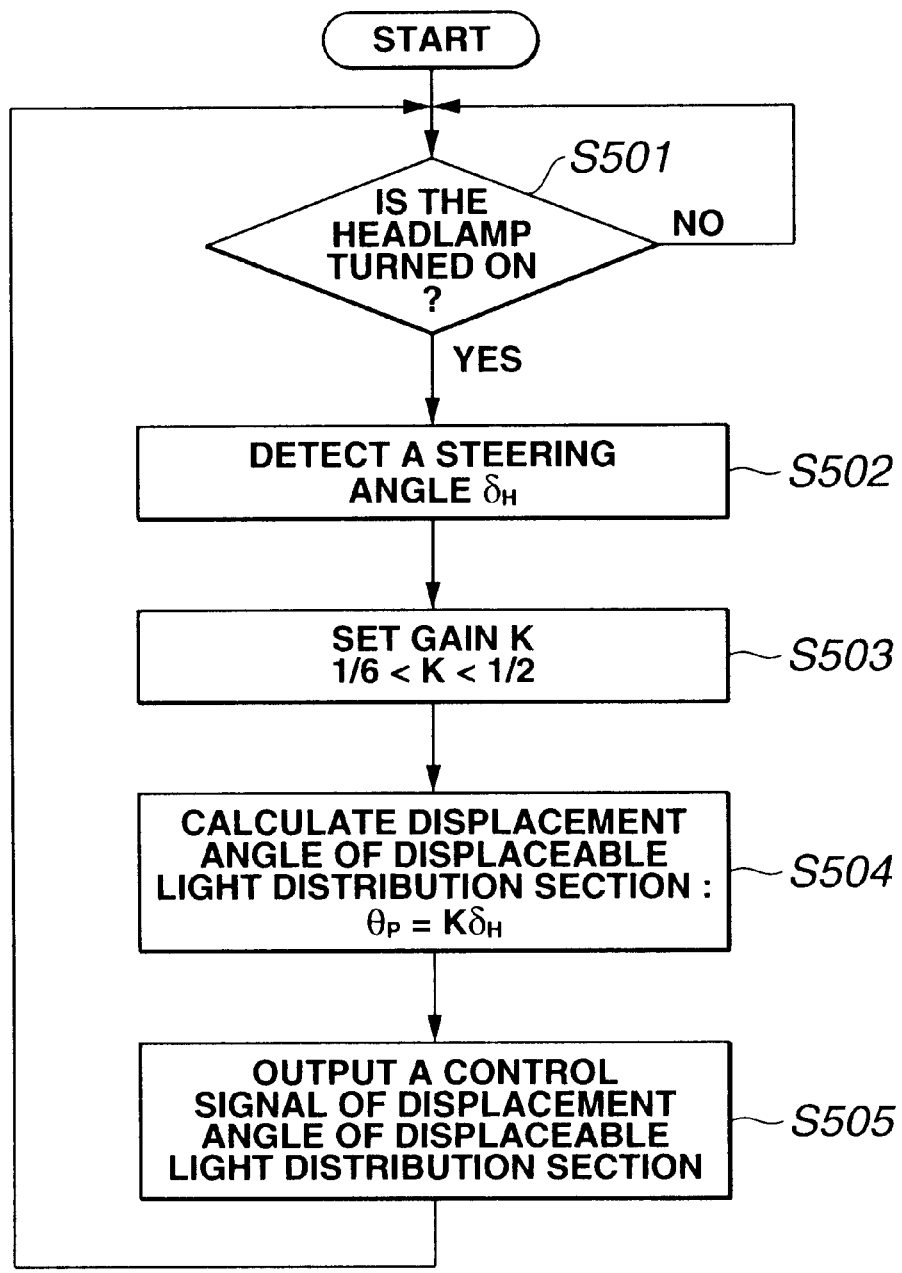
FIG. 5 is an operational flowchart representing an operation of the vehicular lamp system in the first preferred embodiment shown in FIG. 4.

FIG. 5 shows a processing flowchart for explaining a process flow in arithmetic operation circuitry 11.

At a step S501, arithmetic operation circuitry 11 determines if each headlamp 20 (viz., each light source 23A) is turned on or not (illuminated or not).

If each headlamp 20 is turned on (Yes), the routine shown in FIG. 4 goes to the next step S502. Arithmetic operation circuitry 11 reads (detects) steering angle indicative signal detecting steering angle δH at step S502.

Next, arithmetic operation circuitry 11 sets an upper limit value of a range in which a gain K prescribing rotational angle θP of displaceable light distribution section 21 with respect to steering angle δH to ½, sets a lower limit value thereof to ⅙, and sets gain K in above range (at a step S503) (⅙<K<½).

Setting of gain K is carried out in accordance with a vehicular running state of vehicle C. Gain K is variably set in the above predetermined range. In this case, an optimum gain K can be set in accordance with the vehicular running state. However, gain K may be set fixedly before a shipment which falls in the range between the upper limit value of ½ and the lower limit value of ⅙. In this case, a control becomes simple. (These steps correspond to gain setting section).

Next, at a step 504, arithmetic operation circuitry 11 calculates displacement angle θP of displaceable light distribution section 21 according to an equation of θP=K·δH.

Displacement angle θP of each displaceable light distribution section 21 is outputted from arithmetic operation circuitry 11 via corresponding drive/control circuit 12 to be displaced in the steering direction according to the steering angle through set gain K.

Figure 6:
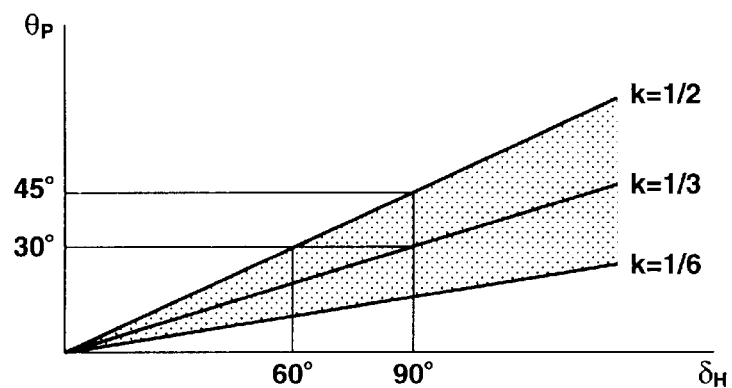
FIG. 6 is a characteristic graph representing a relationship between a steering angle and a displacement angle of each displaceable light distribution section of the vehicular lamp system in the first preferred embodiment shown in FIGS. 1 through 4.

FIG. 6 is a characteristic graph representing a relationship between steering angle δH and displacement angle θP of displaceable light distribution section 21. If gain K is ½, steering angle δH is 90 degrees and displacement angle θp is 45 degrees. If gain K is ⅓, steering angle δH is 90 degrees and displacement angle θp is 15 degrees. Reasons of setting the upper limit value of gain K to ½ and lower limit value of gain K to ⅙ are based on sensory evaluation test results.

Figure 7:
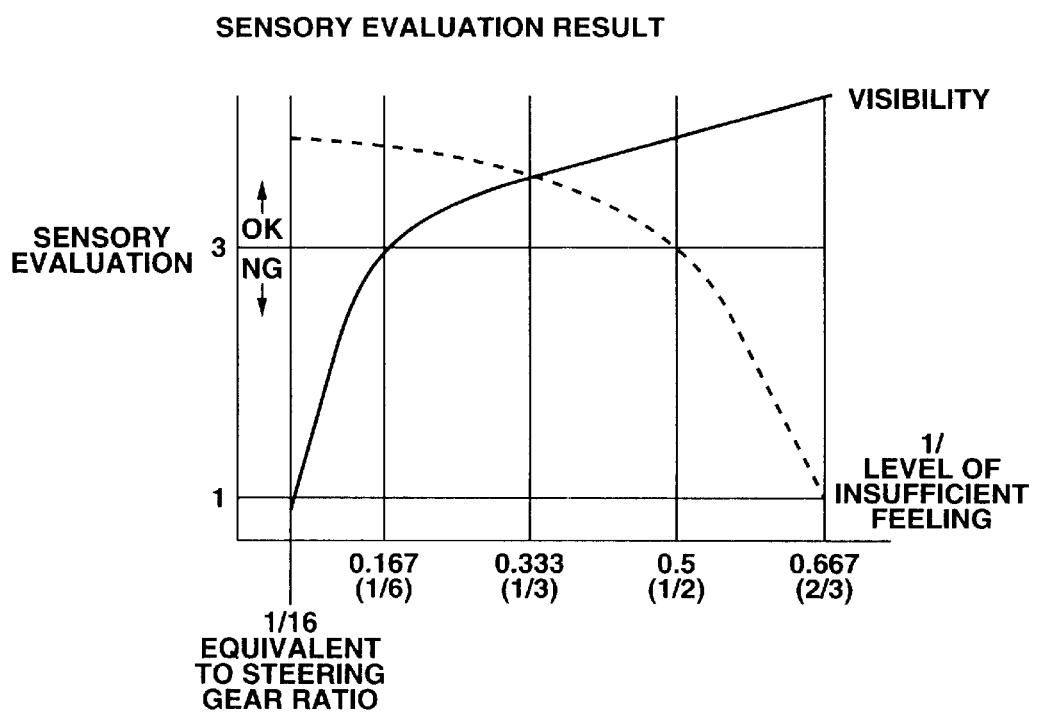
FIG. 7 is a characteristic graph representing a sensory evaluation test result in the first preferred embodiment shown in FIGS. 1 through 4.

FIG. 7 shows a result of the sensory evaluation.

The sensory evaluation test was carried out in a manner such that with gain K of displacement angle θp of displaceable light distribution section 21 with respect to steering angle δH set to plural kinds, actual vehicle experiments were made to evaluate a level of insufficient feeling given to a vehicular driver during a turning of a curved road.

A lateral axis of FIG. 7 denotes a gain K and a longitudinal axis thereof denotes a sensory evaluation value.

It is noted that since, as the level of insufficient feeling becomes increased, the sensory evaluation value becomes reduced, FIG. 7 shows that a dotted curved line indicates an inverse of level of insufficient feeling, viz., a level of sufficient feeling. A bold solid line in FIG. 7 shows the visibility.

It is also noted that the insufficient feeling given to vehicular driver used in the whole specification means an incoincidence of a human's desire to view a place to go with an actually brightened place.

In a case where angle of displacement θp of displaceable light distribution section 21 with respect to the steering angle is pivoted through 30 degrees, viz., gain K was set to ⅔, it was confirmed that inverse of level of insufficient feeling given to driver were greatly increased. Since a large gain K causes an abrupt extension of the radiation range even in a minute steering, the vehicular driver feels insufficient.

The vehicular driver does not expect such a conventional cornering light to be turned on in response to a switch signal but actually feels a system's effect with a radiation range extended in turning direction and interlocked with the steering operation.

To make the vehicular driver actually feel system's effect, it is necessary to reduce the level of insufficient feeling with a performance of the system in mind. In order to reduce the level of insufficient feeling, gain K may be reduced to a value smaller than ⅔. In a sensory evaluation, in a case where gain K is set to ½ so that the angle of displacement of 30 degrees is set at 60 degree of the steering angle, it was discovered that the inverse of the level of insufficient feeling indicates an allowance (or acceptable) level. Hence, the upper limit value of gain K is set to ½ which is an allowance boundary level of the inverse of the level of insufficient feeling, as shown in FIG. 7.

Since the upper limit value of gain K is set as described above, such a light distribution pattern that light radiation range can gradually be extended toward vehicular turning direction with interlock of the steering wheel can be achieved when vehicle C turns a corner. Thus, the insufficient feeling can greatly be suppressed.

In addition, it was confirmed that when gain K was set to ¹⁄₁₆ equivalent to a steering gear ratio, the visibility was extremely reduced but when gain K was to ⅙, visibility indicated an allowable level. That is to say, in a case where, according to the sensory evaluation result, with the lower limit value of gain K set to ⅙, angle of displacement was set to 10 degrees at the time of the steering angle of 60 degrees, it was discovered that the visibility indicated allowance level. Hence, the lower limit value of gain K was set to ⅙ which is the allowable level of the visibility.

Therefore, during a low velocity of vehicle C at corner such as traffic intersection, the vehicular driver watches a wide range of a front running area to run vehicle C. However, since the lower limit value of gain K is set, an improvement effect of the visibility suitable for the vehicular running state can be achieved.

In the first embodiment, gain K is set between upper limit value of ½(=0.5) and lower limit value of ⅙(≈0.167), the displacement of light radiation direction of each displaceable light distribution section 21 and 21 with respect to the steering angle becomes appropriate and gives no insufficient feeling to vehicular driver. In addition, this movement can improve the visibility to the steered direction without a reduction thereof.

FIGS. 8A and 8B show light distribution patterns against a road surface when such a light distribution control as described above was not carried out and was carried out, respectively.

As shown in FIGS. 8A and 8B, a quantity of light on each displaceable light distribution section 21 is less than fixed light distribution section 23 including principal optical axis, a range of relatively low luminance is moved in the leftward direction and rightward directions.

FIG. 8B shows a light distribution pattern when each displaceable light distribution section 21 is pivoted through 30 degrees in rightward direction. Since its principal axis is fixed, the light distribution toward a vehicular front direction does not change but a rightward region of low luminance is extended with 30 degree pivot angle as a center. Hence, the visibility of the vehicular surrounding area is also improved, maintaining visibility in front direction.

(Second Embodiment)

FIGS. 9 through 12 show a second preferred embodiment of the vehicular lamp system according to the present invention.

Figure 9:
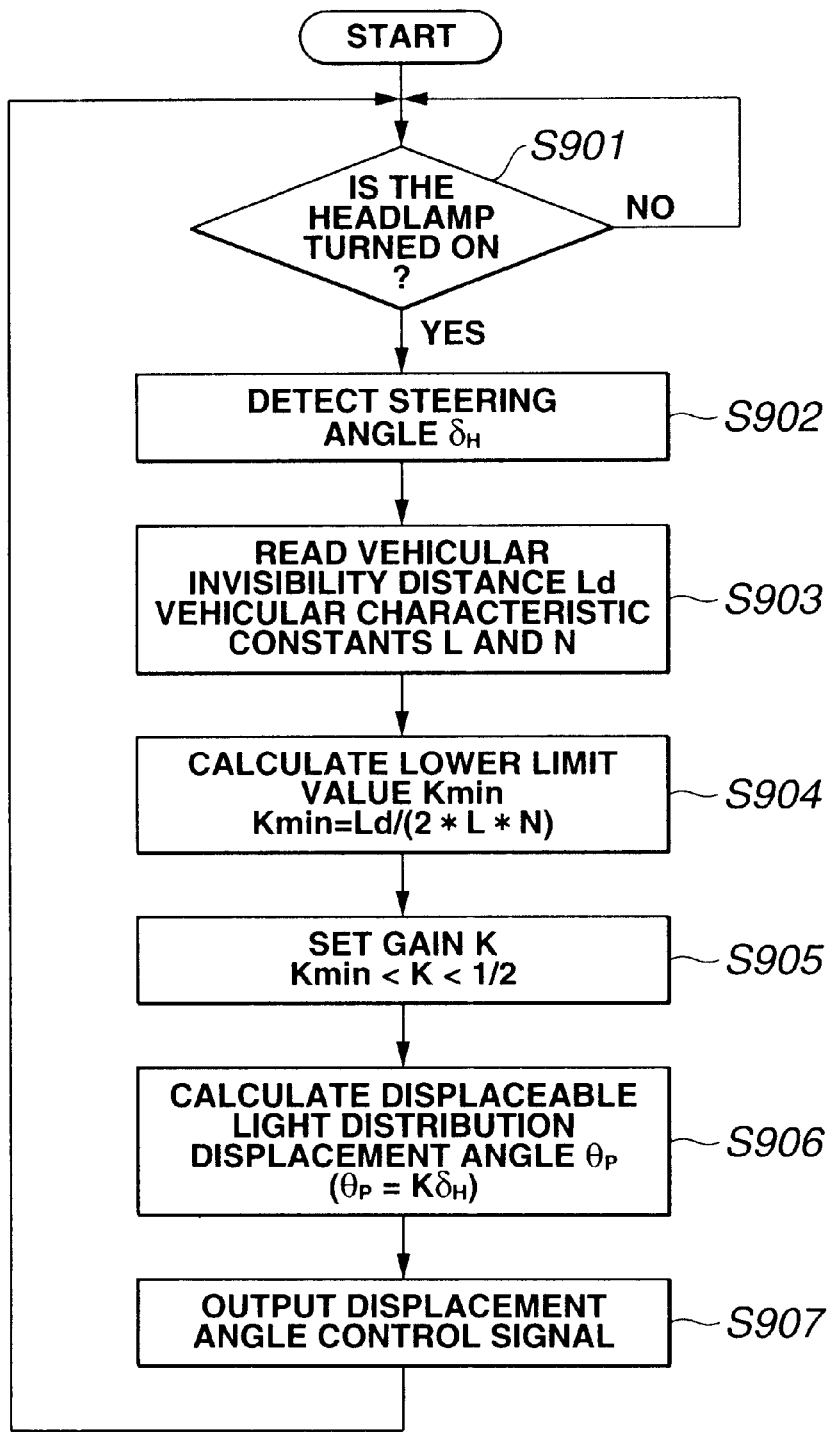
FIG. 9 is an operational flowchart representing an operation of the vehicular lamp system in a second preferred embodiment according to the present invention.
Figure 10:
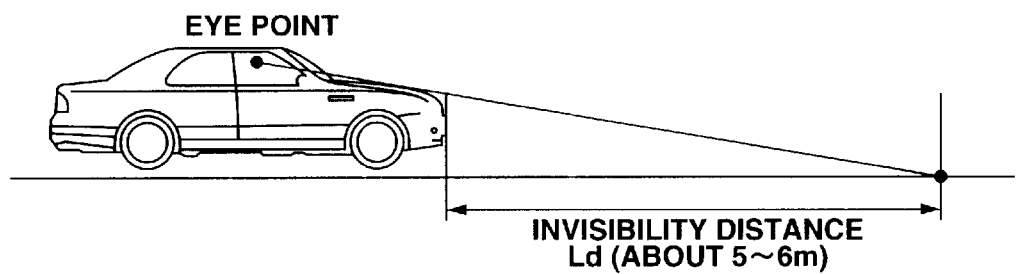
FIG. 10 is an explanatory side view of an automotive vehicle representing an invisibility distance of the vehicle in the second preferred embodiment of the vehicular lamp system.

Specifically, FIG. 9 shows a process flowchart in arithmetic operation circuitry 11. FIG. 10 shows an explanatory view on an invisibility distance Ld.

Figure 11:
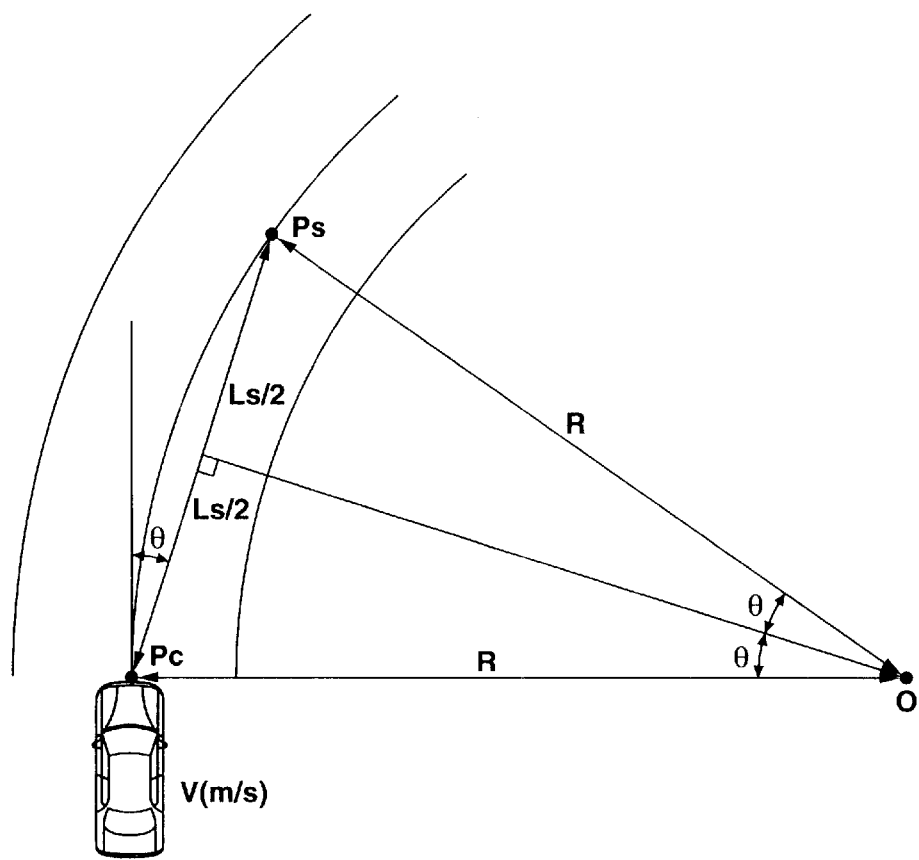
FIG. 11 is an explanatory top view of the automotive vehicle for explaining a method of calculating a minimum value kmin of a gain.

FIG. 11 shows an explanatory view on a visibility distance.

Figure 12:
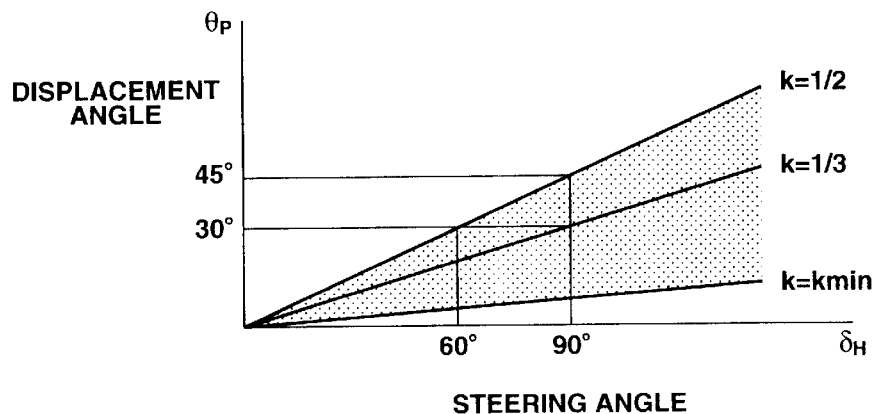
FIG. 12 is a characteristic graph representing a relationship between a steering angle and a displacement angle of each displaceable light distribution section in the vehicular lamp system in a second preferred embodiment.

FIG. 12 shows a graph representing gain K. It is noted that the basic structure of the vehicular lamp system in second preferred embodiment as the same as that described in first preferred embodiment.

In the second embodiment, gain K is set in accordance with a human related information caused by vehicular driver and vehicular information caused by vehicle. That is to say, the lower limit value of gain K is set. The upper limit value of gain K is mechanically set in accordance with vehicle C.

The human related information includes a visibility distance Ls from a front end of vehicle C to a point located straightly at a front area of steered direction and which the vehicular driver visually recognize and an invisibility distance Ld from front end of vehicle C to a point located at the front area and which vehicular driver cannot visually recognize.

Suppose that the vehicular driver in a passenger compartment of vehicle C is visually recognizing a vehicular forwarding line (so-called, white line), point Ps on the vehicular forwarding line which is away from the vehicular driver by visibility distance Ls is position at which vehicular driver is desired to visually be recognized. In addition, the vehicular information includes a vehicular characteristic value for the individual vehicle inherently has, specifically, a wheel base (for example, 2.8 meters) and a steering gear ratio (for example, 16).

As shown in FIG. 9, at a step S901, arithmetic operation circuitry 11 determines if each headlamp 20 (and 20) is turned on.

If each headlamp 20 (and 20) is turned on, the routine goes to a step S902 in which steering angle sensor 30 detects the steering angle through steering angle sensor 30. Next, at a step S903, arithmetic operation circuitry 11 reads invisibility distance Ld, vehicular characteristic value L and N and calculates lower limit value Kmin of gain K from an equation: Kmin=Ld/(2·L·N).

Next, at a step S905, arithmetic operation circuitry 11 sets lower limit value Kmin of gain K prescribing angle of displacement θp of displaceable light distribution section 21 with respect to steering angle p of displaceable light distribution section 21 according to an equation of θp=K·δH.

n, at a step S907, control signal of angle of displacement θP of displaceable light distribution section 21 is outputted to corresponding drive/control circuit 12 and 12.

Therefore, the control over each driver 22 with corresponding drive/control circuit 12 causes displaceable light distribution section 21 to be displaced toward the steered direction with set gain K.

FIG. 10 shows invisibility distance Ld.

Invisibility distance Ld is distance from the front end of vehicle C to a front point which driver cannot visually recognize.

Invisibility distance Ld causes a distance for drive/control circuit to be a dead angle. Invisibility distance Ld is varied according to a vertical position of an eye point. However, invisibility distance Ld of a forward direction of a normal automotive vehicle is generally from 5 meters to 6 meters.

FIG. 11 shows an explanatory view for explaining a method of calculator of lower limit value Kmin of gain K, viz., an introduction method of $$Kmin(=Ld/(2·L·N)) \qquad (1).$$

In details, suppose that vehicle C is running in a steady circular turn at vehicular velocity of vehicle C viz., V (m/s).

From driver's visibility distance Ls (m) and steady-state turning radius R (m) from front end Pc of vehicle C to a point Ps located at a forward direction in steering direction and at which the vehicular driver can visually recognize, an angle θ formed by a center line of vehicle C and a visual recognition direction Pc-Ps of vehicular driver is given:

$$\theta \sin^{-1} Ls/(2·R) \qquad (2).$$

Steady turning radius R is given by $$R=L·N(1+AV^2)/\delta H \qquad (3),$$

wherein A denotes a stability factor (for example, 0.002) and δH denotes steering angle.

Substituting equation (3) into equation (2), following equation can be given:

$$\theta=\sin^{-1} Ls·\delta H/(2·L\times L\times N)·\delta H \qquad (5).$$

Replacing visibility distance Ld of a shortest distance with visibility distance Ls, the lower limit value of gain K in a line of sight direction θ is introduced as $$Kmin=Ld/(2·L·N) \qquad (1).$$

Thus, lower limit value Kmin of gain Kmin is set on basis of shortest distance Ld of visibility distance Ls. However, lower limit value Kmin is set to be equal to or higher than ⅙ from sensory evaluation result of FIG. 7.

FIG. 12 shows a relationship of angle of displacement θP of each displaceable light distribution section 21 to steering angle of δH in second embodiment.

Since, in the second embodiment, the upper limit value of gain K is set to ½ and the lower limit value thereof is set to Kmin. Hence, displacement angle θP of displaceable light distribution section 21 to steering angle δH is set within a gray zone shown in FIG. 12.

In the second embodiment, the generally same advantages as described above as described in the first embodiment can be achieved.

Gain K is set in accordance with the human related information caused by the vehicular driver and/or in accordance with the vehicular information caused by vehicle. Hence, an accurate setting of gain K in accordance with a physical body of the vehicular driver and for each vehicle can be made.

Light distribution state of each displaceable light distribution section 21 may accurately be moved in a direction of line of sight of vehicular driver.

The visibility during the turning of a corner can be improved.

(Third Embodiment)

Figure 13:
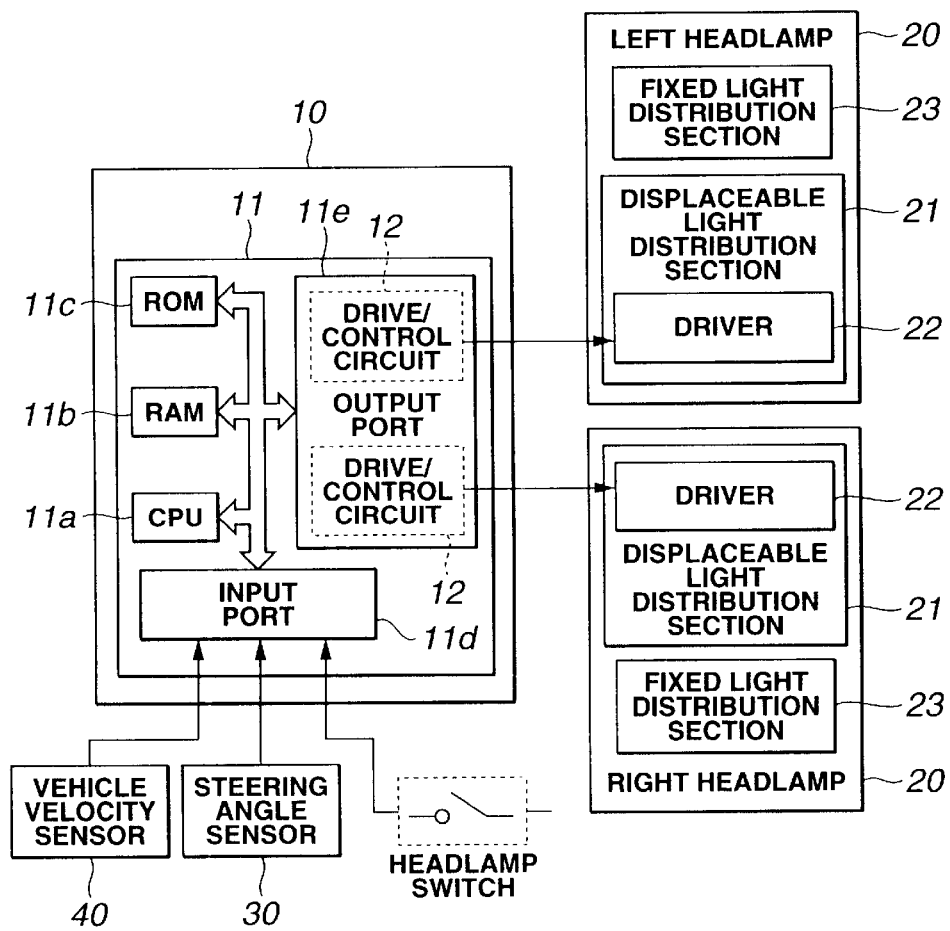
FIG. 13 is a circuit-and-functional block diagram of the vehicular lamp system in a third preferred embodiment according to the present invention.
Figure 14:
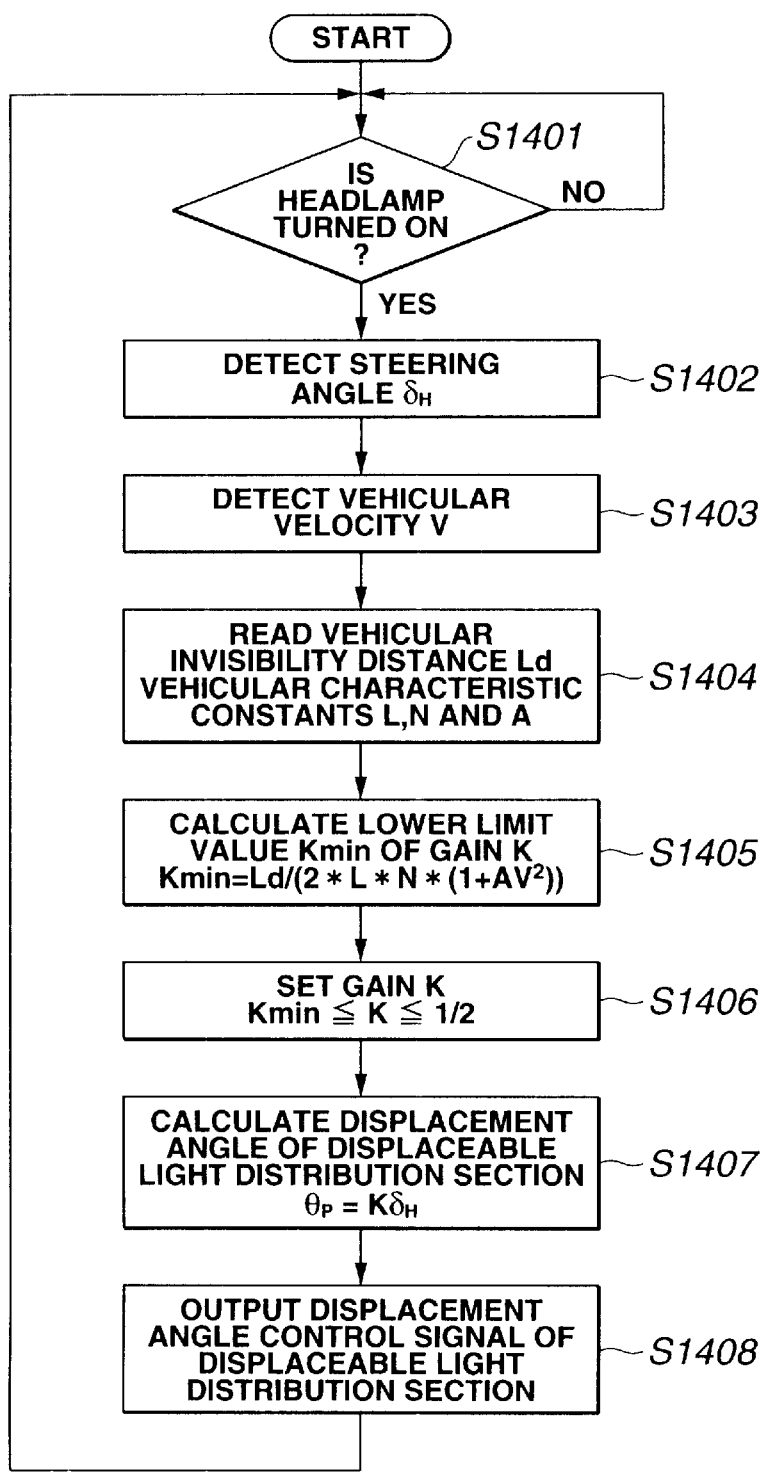
FIG. 14 is an operational flowchart representing an operation of the vehicular lamp system in the third preferred embodiment shown in FIG. 13.

FIGS. 13 and 14 respectively show the vehicular lamp system in a third embodiment.

As shown in FIG. 13, the vehicular lamp system basically includes arithmetic operation circuitry 11 of controller 10 which receives output signals of steering angle sensor 40, which sets angle of displacement θP of each displaceable light distribution section 21 on the basis of output signals, and outputs displacement angle control signal to each drive/control circuit 12.

Each drive/control circuit 12 outputs the drive signal to driver 22 of corresponding displaceable light distribution section 21 and each displaceable light distribution section 21 can pivotally be controlled in each of the leftward and rightward directions with respect to neutral position of vehicle C.

FIG. 14 shows a process flowchart representing a process flow in arithmetic operation circuitry 11.

At a step S1401, arithmetic operation circuitry 11 determines if each headlamp 20 is turned on.

At a step 1402, arithmetic operation circuitry 11 detects steering angle δH from steering angle sensor 30.

At a step S1403, arithmetic operation circuitry 11 detects vehicular velocity V according to vehicular velocity sensor 40. At a step S1404, arithmetic operation circuitry 11 reads invisibility distance Ld of vehicle C and reads characteristic constant L, N, and A of vehicle C, Kmin=1d/(2·L·N(1+AV)) to calculate lower limit value Kmin of gain K.

Suppose that influence of $\sin^{-1}$ according to equation of (4):

$$\theta=Ls/(2·L·\sin^{-1} Ls·\delta H)/(2L·N(1+AV^2)) \qquad (4)$$

(described in the second embodiment) is so small as to be negligible, $$\theta = Ls/(2 \cdot L \cdot N(1+AV^2)) \cdot \delta CH \quad (7).$$

Replacing visibility distance Ls with invisibility distance Ld which is shortest, gain K of direction of line of sight θ to steering angle δH can be introduced as $$Kmin = Ld/(2 \cdot L \cdot N(1+AV^2)) \quad (6).$$

It is, however, noted that lower limit value kmin is set to be equal to or larger than ⅙ according to sensory evaluation result of FIG. 7.

The same advantage as the second embodiment can be achieved in the third embodiment. Since, with stability factor A and vehicular velocity V taken into further consideration, an accurate setting of the lower limit value of gain K in accordance with vehicular velocity V during turn of corner for each vehicle, light distribution section 21 can accurately be moved in direction of line of sight of the vehicular driver and visibility during turn of corner can be improved without failure.

(Fourth Embodiment)

Figure 15:
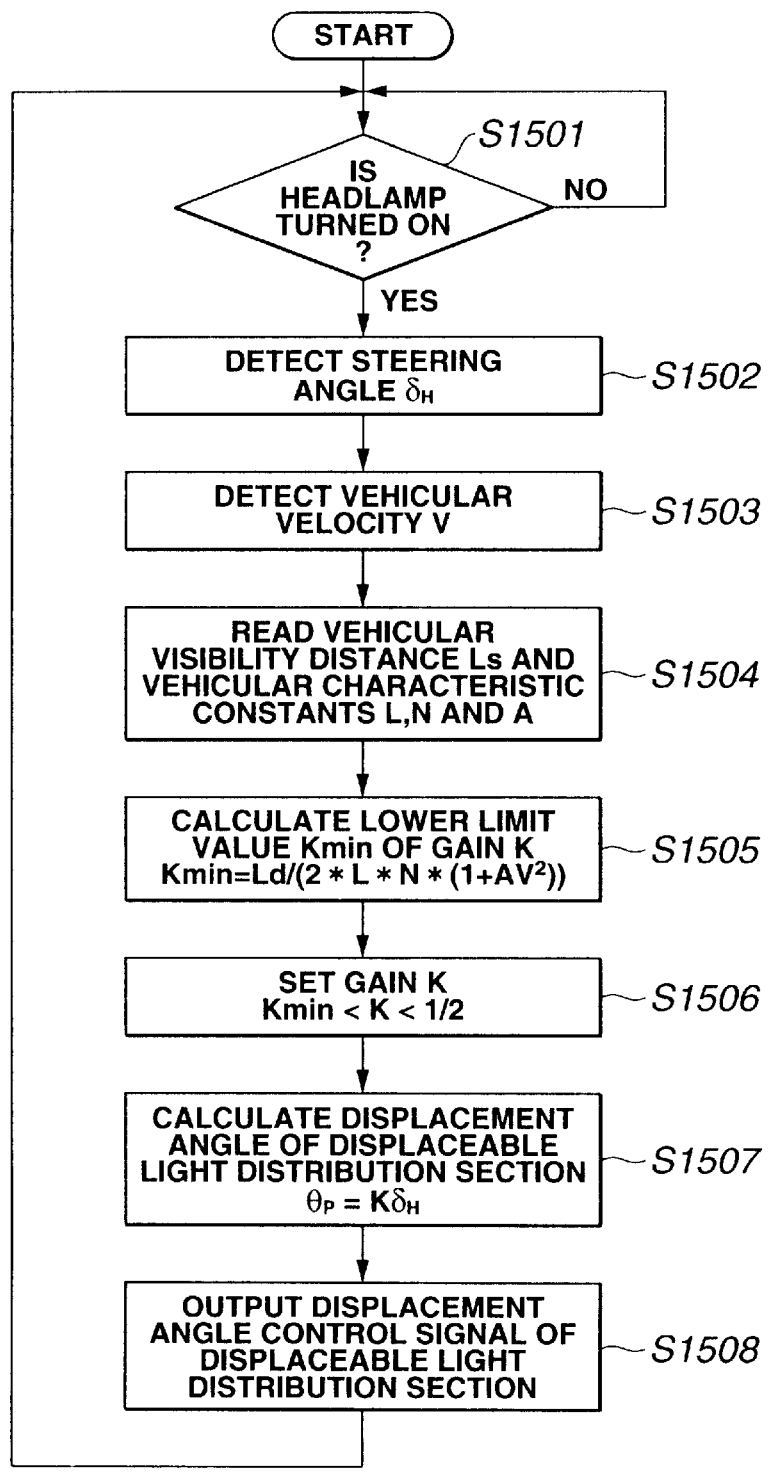
FIG. 15 is an operational flowchart representing an operation of the vehicular lamp system in a fourth preferred embodiment according to the present invention.

FIG. 15 shows an operational flowchart on a fourth preferred embodiment of the vehicular lamp system according to the present invention.

The basic structure of the vehicular lamp system in fourth embodiment is generally the same as that described in the third embodiment.

At a step S1501, arithmetic operation circuitry 11 determines if each headlamp 20 is turned on.

If Yes (turned on) at step S1501, the routine goes to a step S1502.

At a step S1502, arithmetic operation circuitry 11 detects steering angle δH through steering angle sensor 30.

Arithmetic operation circuitry 11 detects vehicular velocity V through vehicular velocity sensor 40 at the next step S1503. Arithmetic operation circuitry 11 detects visibility distance Ls, characteristic constants L, N, and A of vehicle C at a step S1504.

At a step S1505, lower limit value Kmin of gain K is calculated from the following equation:

$$Kmin = Ls/(2 \cdot L \cdot N (1+AV^2)).$$

At the next step S1506, gain K is set to fall in a range with its lower limit value of Kmin and its upper limit value of ½.

At the next step S1507, angle of displacement θP of each displaceable light distribution section 21 is outputted to corresponding drive/control circuit 12 (and 12) at the next step S1508.

Visibility distance Ls is uniquely set to 15 meters until vehicular velocity V reaches to 40 Km/h according to the sensory evaluation test result when riding actually vehicle. At this time, lower limit value Kmin of gain K is ⅙.

Therefore, the vehicular lamp system in the fourth embodiment can achieve the same advantage as that described in the case of the second embodiment. In addition, since an average direction of a visual recognition of the vehicular driver during the vehicular turn on such a corner as described above based on the sensory evaluation provides the lower limit value of the displacement angle of each displaceable light distribution section 21, an effect of improving the visibility which matches with a driver's running condition viewing a wide range surrounding vehicular forwarding direction can be achieved without any insufficient feeling given to the vehicular driver.

(Fifth Embodiment)

Figure 16:
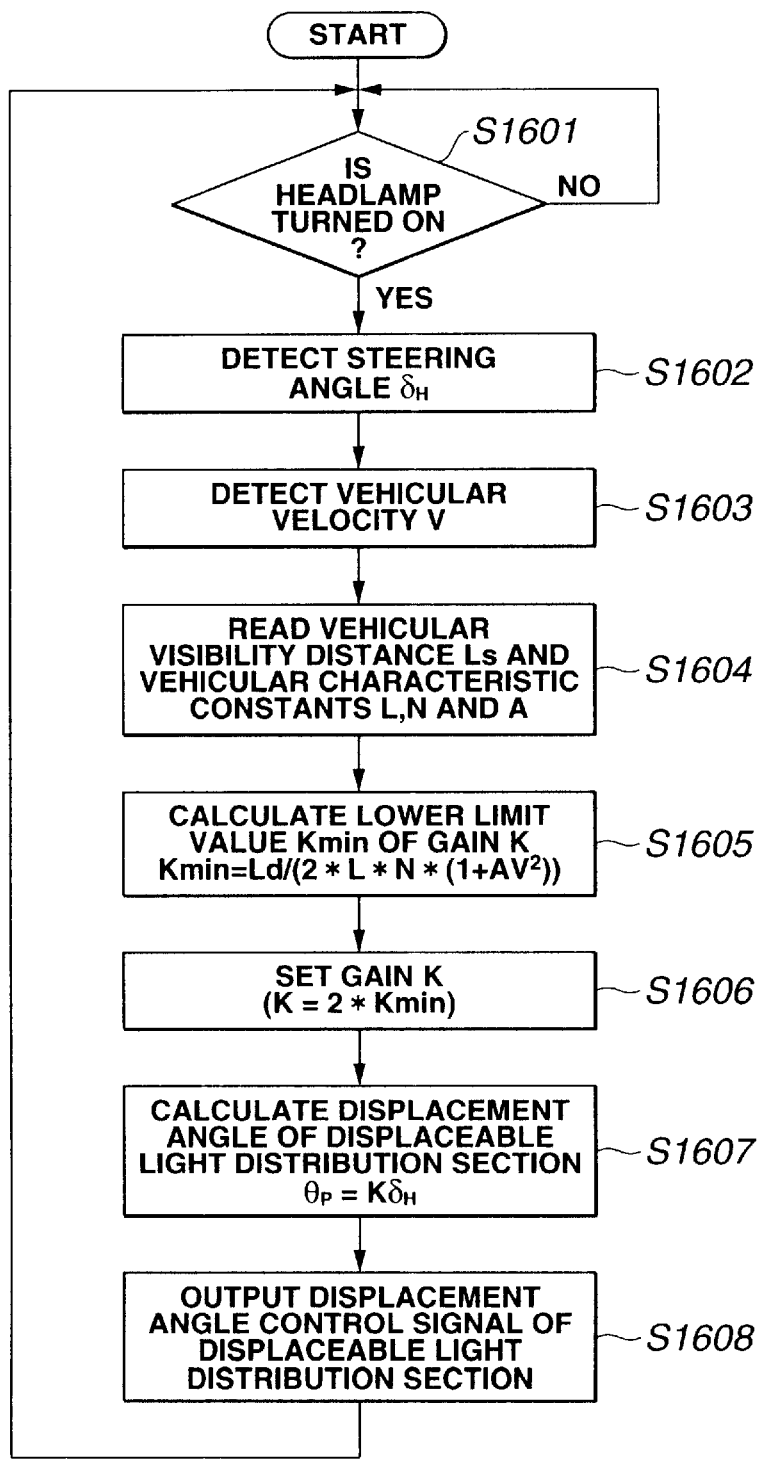
FIG. 16 is an operational flowchart representing an operation of the vehicular lamp system in a fifth preferred embodiment according to the present invention.

FIG. 16 shows an operational flowchart of the vehicular lamp system in a fifth preferred embodiment according to the present invention.

The basic structure of the vehicular lamp system in the fifth embodiment is generally the same as described in the third embodiment.

In FIG. 16, steps S1601 through S1605 are the same as those of steps S1501 through S1505 described in the fourth embodiment. To avoid a double explanation of steps, processes after a step S1606 will be explained below.

As shown in FIG. 16, gain K prescribing angle of displacement θp of each displaceable light distribution section 21 (and 21) to steering angle δH is set to K=2·Kmin at a step S1606. Next, arithmetic operation circuitry 11 calculates angle of displacement θP of each displaceable light distribution section 21 at a step S1607 and outputs control signal of angle of displacement θp to each displaceable light distribution section 21 (and 21) at a step S1608.

Gain K set in this embodiment is twice as large as lower limit value of Kmin=⅙ of gain K set in fourth embodiment.

According to the sensory evaluation in FIG. 7, it was confirmed that gain K which provides a sufficiently high evaluation value in range of gain K in which visibility is the allowance level and level of insufficient feeling which is in allowance level was ⅓.

Hence, since a recommendable gain K is set on the basis of the sensory evaluation test result, an effect of improving the visibility which matches with a driver's running condition viewing a wide range surrounding vehicular forwarding direction can be achieved without insufficient feeling given to the vehicular driver.

(Sixth Embodiment)

Figure 17:
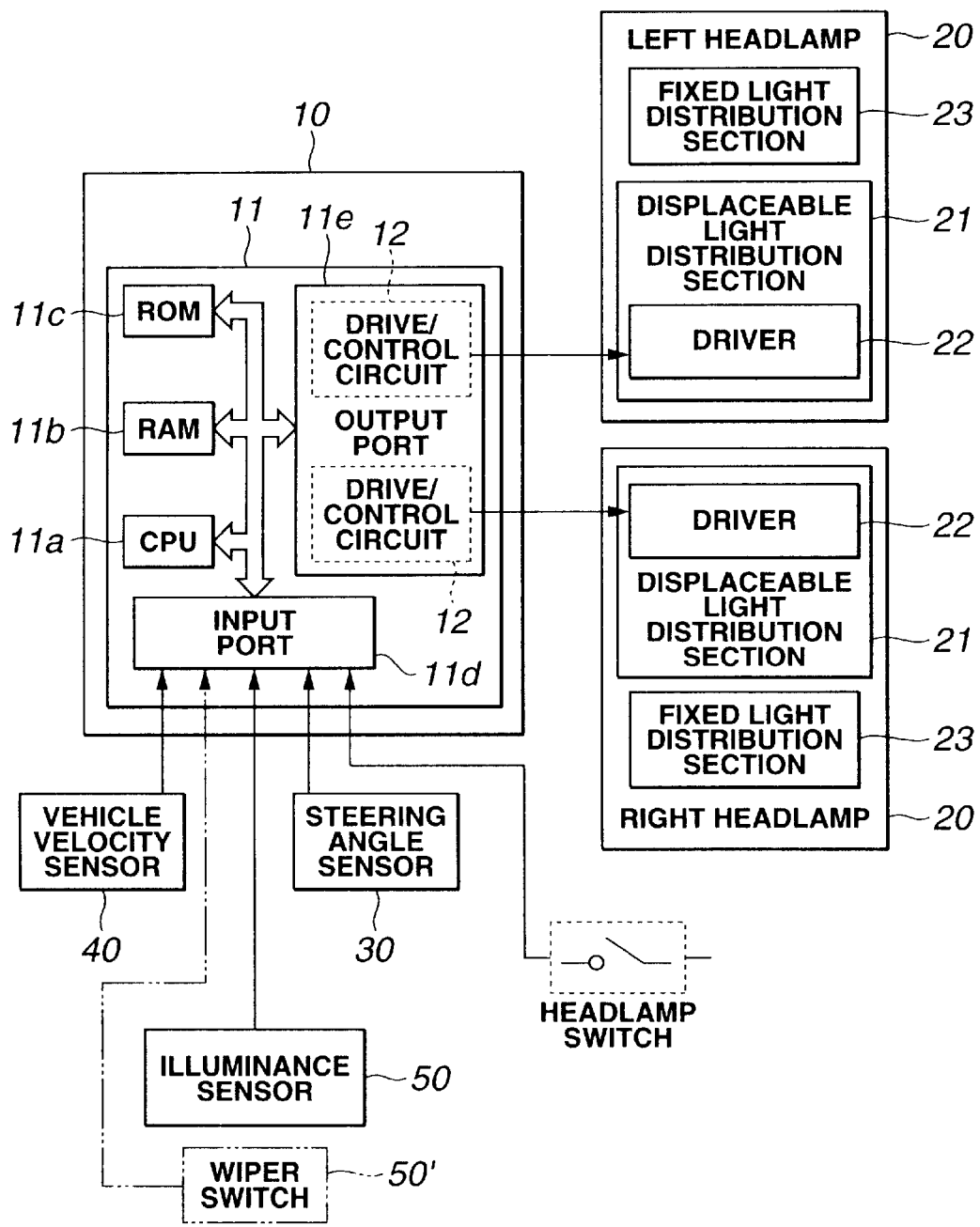
FIG. 17 is a circuit-and-functional block diagram of the vehicular lamp system in a sixth preferred embodiment according to present invention.
Figure 18:
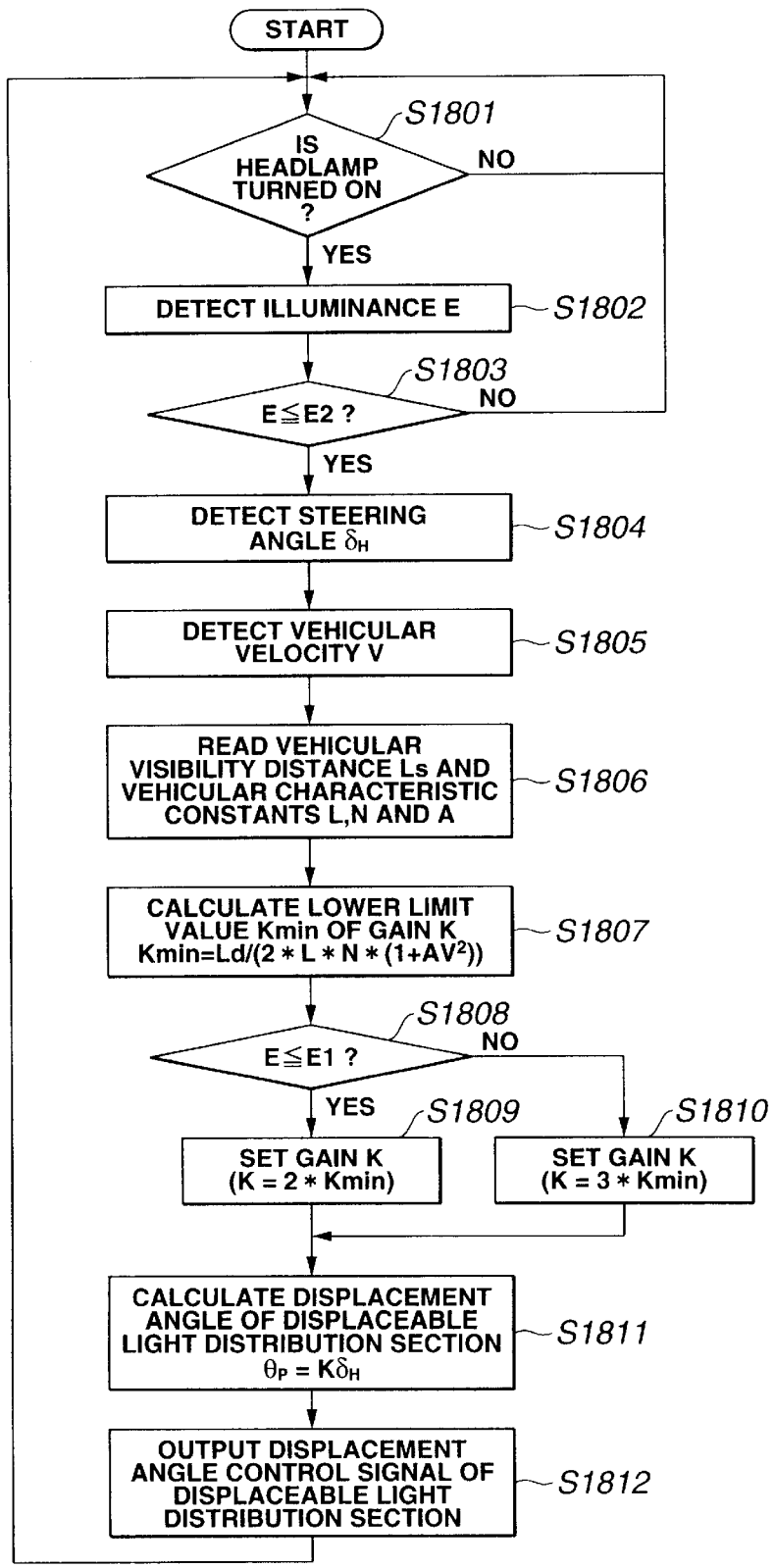
FIG. 18 is an operational flowchart representing an operation of the vehicular lamp system in the sixth preferred embodiment shown in FIG. 17.
Figure 19:
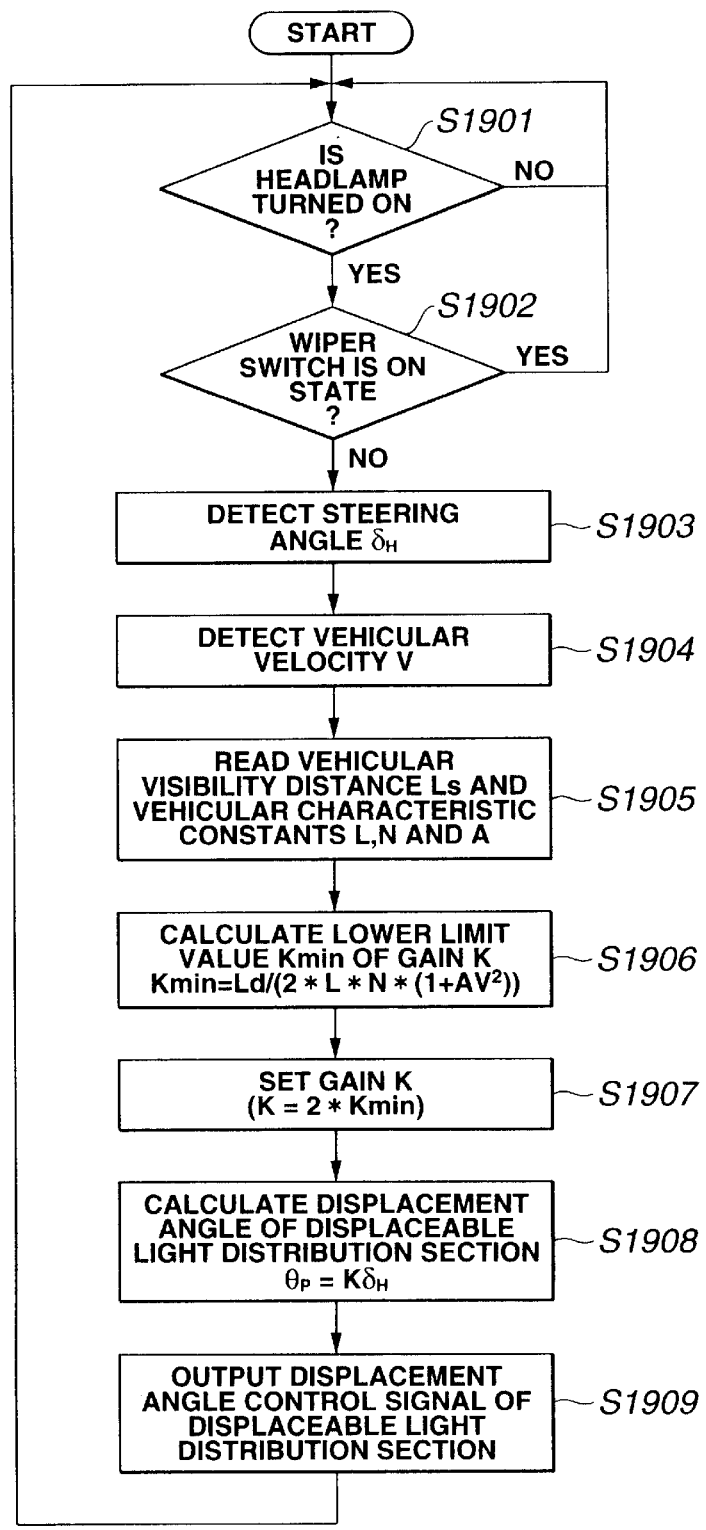
FIG. 19 is an operational flowchart representing an operation of the vehicular lamp system in a seventh preferred embodiment according to the present invention.

FIGS. 17 and 18 show the vehicular lamp system in a sixth preferred embodiment according to the present invention.

Specifically, FIG. 17 shows a circuit-and-functional block diagram of the vehicular lamp system in the sixth preferred embodiment according to the present invention and FIG. 18 shows an operational flowchart executed in the sixth embodiment.

In the sixth embodiment, the basic structure is same as described in the third embodiment. Gain K is set according to the environmental conditions surrounding the vehicle taken into consideration. Environmental conditions include a detection of an illuminance surrounding vehicle.

Gain K is set in accordance with the detected illuminance.

As shown in FIG. 17, arithmetic operation circuitry 11 of controller 10 receives the output signals from steering angle sensor 30 and illuminance sensor 50. Arithmetic operation circuitry 11 sets angle of displacement θp of each displaceable light distribution section 21 (and 21) and outputs displacement angle control signal from each drive/control circuit 12 to driver 22 so that each of displaceable light distribution sections 21 is pivoted in the leftward and rightward directions by displacement angle θp.

As shown in FIG. 18, arithmetic operation circuitry 11 of controller 10 determines if each headlamp 20 is turned on at a step S1801. If Yes (turned on) at step S1801, routine goes to a step S1802 in which illuminance E is detected with an illuminance sensor 50. Illuminance sensor 50 is, for example, installed on an instrument panel of a vehicular compartment.

If illuminance E is equal to or lower than a predetermined value E2 (at a step S1803), the routine goes to a step S1804.

If illuminance E is larger than a predetermined value E2, no control for each displaceable light distribution section 21 is carried out. Since steps S1804 through S1807 are the same as those of steps S1502 through S1505 in FIG. 15 in the fourth embodiment, these explanations of step S1808 and thereafter will only be made below.

At a step S1808, arithmetic operation circuitry 11 determines if illuminance E is equal to or larger than predetermined value E1. If E≦E1 (Yes) at step S1808, routine goes to a step S1809.

If E>E1 at step S1808 (No), the routine goes to a step S1810.

Gain K is set to K=3·Kmin.

Furthermore, arithmetic operation circuitry 11 calculates angle θp of displacement in each displaceable light distribution section 21 (and 21) at a step S1811. At a step S1812, control signal of angle of displacement θP of each displaceable light distribution 21 (and 21) is outputted to each drive/control circuit 12 (or 12).

Illuminance value E2 may be set which provides an illumination standard of an automatic lighting mechanism. In a case where headlamps 20 are illuminated under such an environmental luminance that the automatic lighting mechanism is not illuminated, there is no effect on displacement of light distribution. A wasteful consumption of energy can be suppressed by no execution of control over each displaceable light distribution section 21 (and 21).

In addition, a range equal to or larger than illuminance value E1 or smaller than E2 indicates a dim night, indicates a time at which a road surface is relatively bright due to an illumination of a street lamp or market, or indicates a state in which insufficient feeling is not so given to vehicular driver even if gain K is high. Hence, the visibility can be improved by increasing gain K to a value expressed as K=3·Kmin than a normal luminance value. It is noted that illuminance value E1 may be set to a luminance value which provides a small (dim) lamp illumination standard of automatic lighting mechanism.

(Seventh Embodiment)

In a seventh Embodiment, the vehicular environmental condition is detected according to an operation situation of a wiper switch 50' and gain K is set in accordance with detected operation situation of wiper.

With reference to the block diagram of FIG. 17, illuminance sensor 50 is replaced with wiper switch 50' and output signal from wiper switch 50' is inputted to arithmetic operation circuitry 11 of controller 10. On the basis of output signal from wiper switch 50', arithmetic operation circuitry 11 sets angle of displacement θP of each displaceable light distribution section 21 and displacement angle control signal is outputted to corresponding drive/control circuit 12 (and 12). The drive signal from corresponding one of drive/control circuits 12 (and 12) is outputted to each driver 22 so that each displaceable light distribution section 21 (and 21) is pivoted in the same leftward or rightward direction.

At a step S1901, arithmetic operation circuitry 10 determines whether each headlamp 20 is illuminated turned on or not.

At a step S1902, arithmetic operation circuitry 10 determines if wiper switch 50' is turned to ON if each headlamp 20 is illuminated (Yes at step S1901).

If wiper switch 50' is turned to OFF (No at step S1902), the routine goes to a step S1903.

If wiper switch 50' is turned to ON (Yes at step S1902), the control over each displaceable light distribution section 21 is not carried out. Steps of S1903 through S1909 are the same as those of S1602 through S1608 in FIG. 16 described in the fifth embodiment (the explanation thereof will be omitted).

It is difficult to obtain an effect of improvement in visibility through the light distribution control due to a light scattering of a headlamp radiation over a road surface. Hence, during a wiper operation, control of each displaceable light distribution section 21 is not carried out and a wasteful consumption of energy can be suppressed.

(Eighth Embodiment)

In an eighth preferred embodiment, vehicular velocity sensor 40 is utilized so that a maximum value of angle of displacement θp of each displaceable light distribution section 21 is set in accordance with vehicular velocity V utilizing vehicular velocity sensor 40.

Figure 20:
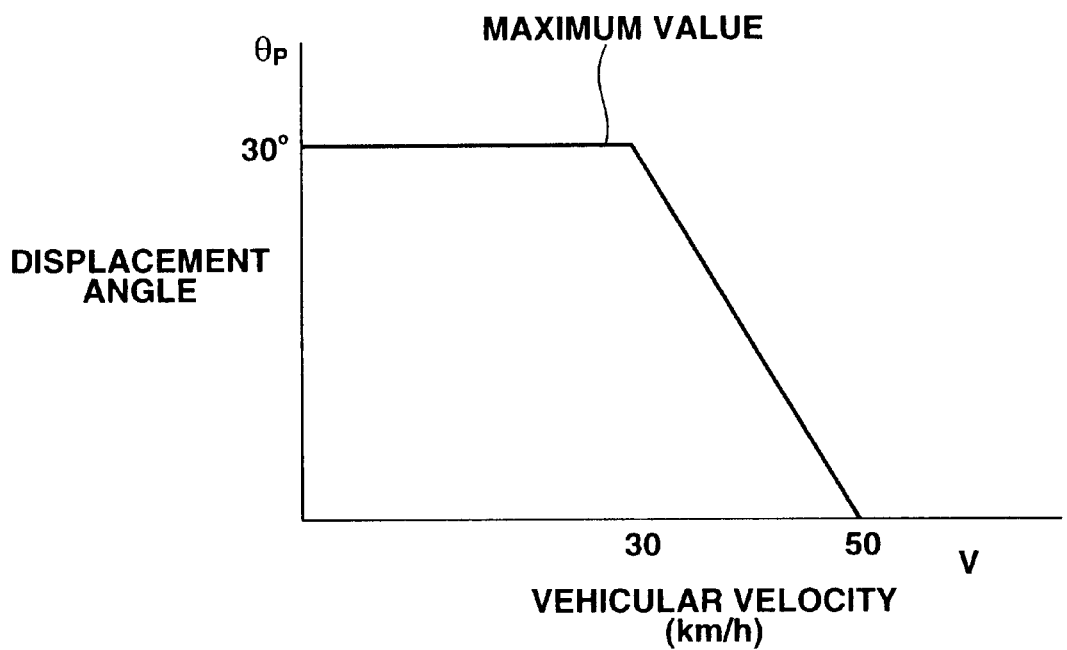
FIG. 20 is a characteristic graph representing a relationship between a vehicular velocity and a maximum value of a displacement angle of each displaceable light distribution section of the vehicular lamp system in en eighth preferred embodiment according to the present invention.

FIG. 20 shows a relationship between vehicular velocity V and angle of displacement θp of each displaceable light distribution section 21 (and 21).

For example, a maximum value of displacement angle is determined as 30 degrees when vehicular velocity V is equal to or lower than 30 Km/h which is a low velocity region. In a range from 30 Km/h to 50 Km/h which is a middle velocity range, as shown in FIG. 20, as vehicular velocity V is increased, displacement angle θp is set to be smaller.

An effect of visibility due to a displacement of each displaceable light distribution section 21 (21) is large in a low vehicular velocity region and becomes null as vehicular velocity V is increased from a middle velocity region to a high velocity region. In details, since vehicular velocity V falls in the middle velocity region, a frequency of driver's confirming a surrounding area of vehicle C is reduced and a line of driver's sight tends to be converged in the vehicular forwarding direction, the light distribution control to meet with an actual structure of the vehicular driver's visual recognition can be achieved.

The entire contents of Japanese Patent Application No. 2000-102664 filed in Japan on Apr. 4, 2000 are herein incorporated by reference. Although the invention has been described above by reference to certain embodiments of the invention, the present invention is not limited to those embodiments described above. Modifications and variations of the embodiments described above will occur to those skilled in the art in a light of above teachings.

The scope of the invention is defined with reference to the following claims.

What is claimed is:

1. A vehicular lamp system, comprising:
   a displaceable light distribution section that radiates a light from a light source into a predetermined light distribution area and is enabled to displace its light distribution state toward a direction toward which a displacement angle thereof to an optical axis of the light source is formed;
   a drive section to drive the displaceable light distribution section to at least horizontally displace its light distribution state from the optical axis of the light source by the displacement angle;
   a steering angle sensor to detect a steering angle of a vehicular steering wheel; and
   a controller to control the drive section to displace the light distribution section by the displacement angle in accordance with a detected value of the steering angle, the controller comprising a gain setting section that sets a gain prescribing the displacement angle of the displaceable light distribution section with respect to the detected value of the steering angle to fall in a predetermined range such as to displace the displaceable light distribution section by a predetermined displacement angle smaller than the detected value of the steering angle,
   wherein the predetermined range is between ⅙ and ½.

2. A vehicular lamp system, comprising:
- a displaceable light distribution section that radiates a light from a light source into a predetermined light distribution area and is enabled to displace its light distribution state toward a direction toward which a displacement angle thereof to an optical axis of the light source is formed;
- a drive section to drive the displaceable light distribution section to displace its light distribution state from the optical axis of the light source by the displacement angle;
- a steering angle sensor to detect a steering angle of a vehicular steering wheel; and
- a controller to control the drive section to displace the light distribution section by the displacement angle in accordance with a detected value of the steering angle, the controller comprising a gain setting section that sets a gain prescribing the displacement angle of the displaceable light distribution section with respect to the detected value of the steering angle to fall in a predetermined range such as to displace the displaceable light distribution section by a predetermined displacement angle smaller than the detected value of the steering angle,
- wherein the gain setting section of the controller sets the gain variably in the predetermined range, and
- wherein the predetermined range is between 1/6 and 1/2.

3. A vehicular lamp system, comprising:
- a displaceable light distribution section that radiates a light from a light source into a predetermined light distribution area and is enabled to displace its light distribution state toward a direction toward which a displacement angle thereof to an optical axis of the light source is formed;
- a drive section to drive the displaceable light distribution section to displace its light distribution state from the optical axis of the light source by the displacement angle;
- a steering angle sensor to detect a steering angle of a vehicular steering wheel; and
- a controller to control the drive section to displace the light distribution section by the displacement angle in accordance with a detected value of the steering angle, the controller comprising a gain setting section that sets a gain prescribing the displacement angle of the displaceable light distribution section with respect to the detected value of the steering angle to fall in a predetermined range such as to displace the displaceable light distribution section by a predetermined displacement angle smaller than the detected value of the steering angle,
- wherein the gain setting section of the controller sets gain fixedly in the predetermined range, and
- wherein the predetermined range is between 1/6 and 1/2.

4. A vehicular lamp system, comprising:
- a displaceable light distribution section that radiates a light from a light source into a predetermined light distribution area and is enabled to displace its light distribution state toward a direction toward which a displacement angle thereof to an optical axis of the light source is formed;
- a drive section to drive the displaceable light distribution section to displace its light distribution state from the optical axis of the light source by the displacement angle;
- a steering angle sensor to detect a steering angle of a vehicular steering wheel; and
- a controller to control the drive section to displace the light distribution section by the displacement angle in accordance with a detected value of the steering angle, the controller comprising a gain setting section that sets a gain prescribing the displacement angle of the displaceable light distribution section with respect to the detected value of the steering angle to fall in a predetermined range such as to displace the displaceable light distribution section by a predetermined displacement angle smaller than the detected value of the steering angle,
- wherein the predetermined range is between 1/6 and 1/2, and
- wherein the gain setting section of the controller sets the gain variably in the predetermined range according to a human related information caused by a vehicular driver.

5. A vehicular lamp system as claimed in claim 1, wherein the gain setting section of the controller sets a vehicular information caused by the vehicle.

6. A vehicular lamp system as claimed in claim 4, wherein the human related information comprises at least one of a visibility distance from a vehicular front end to a point for the vehicular driver to be visually recognized located at a front area of a steered direction of the steering wheel or an invisibility distance from vehicular front end to a point for the vehicular driver to be unable to be visually recognized located at the front area of the steered direction of the steering wheel.

7. A vehicular lamp system as claimed in claim 5, wherein the vehicular information is at least one of a vehicular velocity or a vehicular characteristic value that an individual vehicle inherently has.

8. A vehicular lamp system as claimed in claim 2, wherein the gain setting section of the controller sets a lower limit value and an upper limit value of the gain in the predetermined range and sets the gain, the gain falling in the predetermined range from its lower limit value to its upper limit value.

9. A vehicular lamp system as claimed in claim 2, wherein the gain setting section of the controller detects a lower limit value in the predetermined range and the gain is set on the basis of the lower limit value.

10. A vehicular lamp system as claimed in claim 7, wherein the gain setting section of the controller sets the gain which is twice as large as the lower limit value of the predetermined range.

11. A vehicular lamp system, comprising:
- a displaceable light distribution section that radiates a light from a light source into a predetermined light distribution area and is enabled to displace its light distribution state toward a direction toward which a displacement angle thereof to an optical axis of the light source is formed;
- a drive section to drive the displaceable light distribution section to displace its light distribution state from the optical axis of the light source by the displacement angle;
- a steering angle sensor to detect a steering angle of a vehicular steering wheel; and
- a controller to control the drive section to displace the light distribution section by the displacement angle in accordance with a detected value of the steering angle, the controller comprising a gain setting section that sets a gain prescribing the displacement angle of the displaceable light distribution section with respect to the detected value of the steering angle to fall in a predetermined range such as to displace the displaceable light distribution section by a predetermined displacement angle smaller than the detected value of the steering angle, wherein the predetermined range is between 1/6 and 1/2, and wherein the gain setting section of the controller sets the gain in accordance with an environment surrounding the vehicle.

12. A vehicular lamp system as claimed in claim 11, further comprising an illuminance sensor to detect an illuminance of an area surrounding the vehicle and wherein the gain setting section of the controller sets the gain in accordance with the detected illuminance.

13. A vehicular lamp system as claimed in claim 11, wherein the controller further comprises a wiper operation situation detector to detect if a wiper switch is turned on or off and the gain setting section of the controller sets the gain in accordance with a result of detection of whether the wiper switch is turned on or off.

14. A vehicular lamp system, comprising:
a displaceable light distribution section that radiates a light from a light source into a predetermined light distribution area and is enabled to displace its light distribution state toward a direction toward which a displacement angle thereof to an optical axis of the light source is formed;
a drive section to drive the displaceable light distribution section to displace its light distribution state from the optical axis of the light source by the displacement angle;
a steering angle sensor to detect a steering angle of a vehicular steering wheel; and
a controller to control the drive section to displace the light distribution section by the displacement angle in accordance with a detected value of the steering angle, the controller comprising a gain setting section that sets a gain prescribing the displacement angle of the displaceable light distribution section with respect to the detected value of the steering angle to fall in a predetermined range such as to displace the displaceable light distribution section by a predetermined displacement angle smaller than the detected value of the steering angle, wherein the predetermined range is between 1/6 and 1/2, wherein the gain setting section of the controller sets the gain variably in the predetermined range, and wherein the controller further comprises another setting section that sets a maximum value of the displacement angle of the displaceable light distribution section up to which the displaceable light distribution section is enabled to be displaced in accordance with a vehicular velocity.

15. A vehicular lamp system, comprising:
a displaceable light distribution section that radiates a light from a light source into a predetermined light distribution area and is enabled to displace its light distribution state toward a direction toward which a displacement angle thereof to an optical axis of the light source is formed;
a drive section to drive the displaceable light distribution section to displace its light distribution state from the optical axis of the light source by the displacement angle;
a steering angle sensor to detect a steering angle of a vehicular steering wheel; and a controller to control the drive section to displace the light distribution section by the displacement angle in accordance with a detected value of the steering angle, the controller comprising a gain setting section that sets a gain prescribing the displacement angle of the displaceable light distribution section with respect to the detected value of the steering angle to fall in a predetermined range such as to displace the displaceable light distribution section by a predetermined displacement angle smaller than the detected value of the steering angle, wherein the predetermined range is between 1/6 and 1/2, and wherein the vehicular lamp system is mounted in an automotive vehicle.

16. A vehicular lamp system, comprising:
a displaceable light distribution section that radiates a light from a light source into a predetermined light distribution area and is enabled to displace its light distribution state toward a direction toward which a displacement angle thereof to an optical axis of the light source is formed;
a drive section to drive the displaceable light distribution section to at least horizontally displace its light distribution state from the optical axis of the light source by the displacement angle;
a steering angle sensor to detect a steering angle of a vehicular steering wheel; and
a controller to control the drive section to displace the light distribution section by the displacement angle in accordance with a detected value of the steering angle, the controller comprising a gain setting section that sets a gain prescribing the displacement angle of the displaceable light distribution section with respect to the detected value of the steering angle to fall in a predetermined range such as to displace the displaceable light distribution section by a predetermined displacement angle smaller than the detected value of the steering angle, wherein the predetermined range is between 0.167 and 0.5.

17. A vehicular lamp system, comprising:
a displaceable light distribution section that radiates a light from a light source into a predetermined light distribution area and is enabled to displace a light distribution state thereof toward a direction toward which a displacement angle thereof to an optical axis of the light source is formed;
a drive section to drive the displaceable light distribution section to at least horizontally displace its light distribution state from an optical axis of the light source by a displacement angle;
a steering angle sensor to detect a steering angle of a vehicular steering wheel; and
a controller to control the drive section to displace the displaceable light distribution section by the displacement angle in accordance with a detected value of the steering angle, the controller comprising a gain setting section that sets a gain prescribing the displacement angle of the displaceable light distribution section with respect to the detected value of the steering angle and a visibility of the light distribution area corresponding to an inverse of a level of insufficient feeling in a sensory evaluation test, wherein the gain prescribes the displacement angle with respect to the detected value of the steering angle to fall in a predetermined range between 1/6 and 1/2.

18. A vehicular lamp system, comprising:

displaceable light distributing means for radiating a light from a light source into a predetermined light distribution area, the displaceable light distributing means being enabled to displace its light distribution state toward a direction toward which a displacement angle thereof to an optical axis of the light source is formed;

driving means for driving displaceable light distributing means to at least horizontally displace the light distribution state from the optical axis of the light source by a displacement angle;

steering angle sensing means for detecting a steering angle of a vehicular steering wheel; and controlling means for controlling the driving means to displace the light distributing means by the displacement angle in accordance with a detected value of the steering angle, the controlling means comprising gain setting means for setting a gain prescribing the displacement angle with respect to a detected value of steering angle to fall in a predetermined range such as to displace the displaceable light distributing means by a predetermined displacement angle which is smaller than the detected value of the steering angle, wherein the predetermined range is between ⅙ and ½.

19. A method of adjusting a light distribution area of a head light on a vehicle, comprising:

detecting a steering angle of the vehicle;

calculating a displacement angle of the head light with respect to the detected steering angle;

applying a gain to the calculated displacement angle such that the displacement angle with applied gain is smaller than the detected steering angle; and horizontally displacing the headlight by the displacement angle with applied gain, wherein the gain is in a predetermined range of about ⅙ to about ½.

20. The method as claimed in claim 19, wherein the gain is variably set in the predetermined range.

21. The method as claimed in claim 19, wherein the gain is fixedly set in the predetermined range.

* * * * *